W. CLARK.
Corn-Planter.
No 24,991. Patented Aug. 9, 1859.
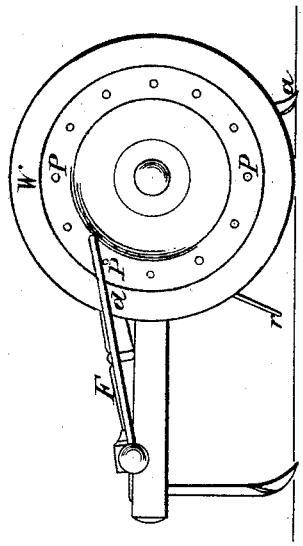
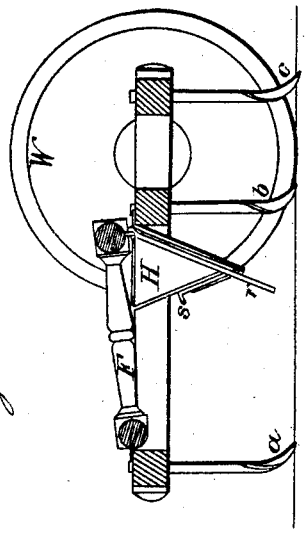
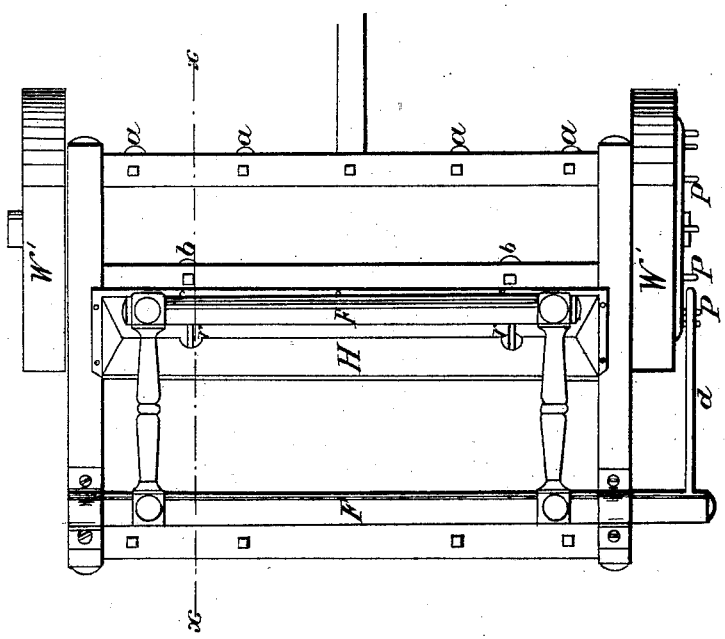
Witnesses:
Inventor:

UNITED STATES PATENT OFFICE.

WALTER CLARK, OF PALMYRA, ILLINOIS.

IMPROVEMENT IN SEED-PLANTERS.

Specification forming part of Letters Patent No. 24,991, dated August 9, 1859.

*To all whom it may concern:*

Be it known that I, WALTER CLARK, of Palmyra, in the county of Lee and State of Illinois, have invented a new and useful Improvement in Seed-Planters; and I do hereby declare that the following is a full, clear, and exact description of the same, reference being had to the annexed drawings, forming part of this specification, in the several figures of which similar characters of reference denote the same part.

Figure 1 is a top view of my improved seed-planter. Fig. 2 is a side view of the same. Fig. 3 is a section on line $x\,x$.

The nature of my invention consists in the arrangement of devices hereinafter described, which is made up of a series of pins on the wheel of the planter, in combination with a frame having an arm which rests upon the pins on the wheel, and a swinging rod which passes through the discharge-opening in the seed-hopper, so that by the revolution of the wheel the arm of the frame is raised by the pin on which it rests, and, having passed, it falls on the next, thus raising and lowering the frame and constantly keeping the rod in motion through the discharge, so as to prevent the seed from clogging in the opening and assisting its free passage therefrom. There are also slides over the discharge-openings to regulate their size.

In the drawings, W W' are the wheels, and P P are the pins on the wheel W.

F is the frame, with its arm $d$ resting on the pins P, and rod $r$ passing through the discharge-opening of the hopper H.

$s$ is the slide over the discharge, and $a\,b\,c$ the teeth of the planter, for the purpose of loosening the earth, making the furrow, and covering over the seed.

The mode of operation is as follows: The revolution of the wheel W, acting upon the arm of the agitating-frame F, by means of the pins P, keeps the said agitator constantly rising and falling, and the rod $r$, passing through the discharge-opening, prevents the seed from clogging it, the slide $s$ regulating the size of the opening. The front row of teeth, $a$, break up the ground, the next row, $b$, directly in front of the discharge-opening, makes the furrow, into which the seed falls from the hopper through the opening, and is covered over by the last row, $c$.

The great advantage of this construction lies in the agitator passing directly through the adjustable seed-opening in the side of the hopper, whereby all danger of clogging is obviated.

I am aware that the passing of reciprocating rod through the discharge-tube is not new. Therefore I disclaim this character of agitator.

What I do claim, and desire to secure by Letters Patent, is—

The arrangement of the reciprocating agitating-rod $r$, when passing through the adjustable seed-discharge opening in the side of the hopper, with the frame F, wheels W, pins P, teeth $a\,b\,c$, hopper H, and adjustable slide $s$, the whole being constructed as and for the purpose set forth.

In testimony whereof I have hereunto signed my name before two subscribing witnesses.

WALTER CLARK.

Witnesses:
JOHN PLATNER,
M. B. SPOFFORD.